Nov. 12, 1935.  S. T. BEEKER  2,020,631

MATERIAL HANDLING MECHANISM

Filed Feb. 17, 1932  9 Sheets-Sheet 1

INVENTOR:
Samuel T. Beeker;
By
Chas. M. Nieren,
ATT'Y.

INVENTOR:
Samuel T. Beeker,
By
Chas. M. Nissen,
ATT'Y.

Nov. 12, 1935. S. T. BEEKER 2,020,631
MATERIAL HANDLING MECHANISM
Filed Feb. 17, 1932 9 Sheets-Sheet 6

INVENTOR:
Samuel T. Beeker,
BY
Chas. M. Nissen,
ATTY.

INVENTOR:
Samuel T. Beeker,
BY
Chas. M. Nissen,
ATT'Y.

Nov. 12, 1935.  S. T. BEEKER  2,020,631
MATERIAL HANDLING MECHANISM
Filed Feb. 17, 1932  9 Sheets-Sheet 8

INVENTOR:
Samuel T. Beeker,
By
Chas. M. Nissen,
ATT'Y.

Nov. 12, 1935.   S. T. BEEKER   2,020,631
MATERIAL HANDLING MECHANISM
Filed Feb. 17, 1932   9 Sheets-Sheet 9

Fig. 17

INVENTOR:
Samuel T. Beeker,
By Chas. M. Nissen,
ATT'Y.

Patented Nov. 12, 1935

2,020,631

UNITED STATES PATENT OFFICE 2,020,631

MATERIAL HANDLING MECHANISM

Samuel T. Beeker, Columbus, Ohio, assignor to The Jeffrey Manufacturing Company, a corporation of Ohio Application February 17, 1932, Serial No. 593,569

8 Claims. (Cl. 212—77)

My invention relates to improvements in trolley bucket conveyers for handling coal, gravel, sand and other materials by transferring the same from a track hopper to storage bins or silos, and one of the objects of my invention is to provide improved and efficient apparatus of this type utilizing a single cable for both hoisting and traversing purposes.

Another object of the invention is the provision of means enabling the use of two hoisting drums for both elevating the bucket to a horizontal trackway and traversing the bucket along such trackway to a predetermined silo.

Another object of the invention is the provision of differential power transmission mechanism between two hoisting drums combined with separate motors one for operating said hoisting drums to effect hoisting of a bucket and the other for operating said hoisting drums to effect traversing of the bucket.

A further object of the invention is to provide means for clamping the bucket carriage to the trolley trackway when the bucket is not connected to said carriage for horizontal travel along the trackway.

A further object of the invention is the provision of a releasable electro-magnetic clutch between a traversing motor and a pair of hoisting drums having between them differential power transmission mechanism to which is connected a hoisting motor.

Other objects of the invention will appear hereinafter, the novel features and combinations being set forth in the appended claims.

In the accompanying drawings

Figure 1:
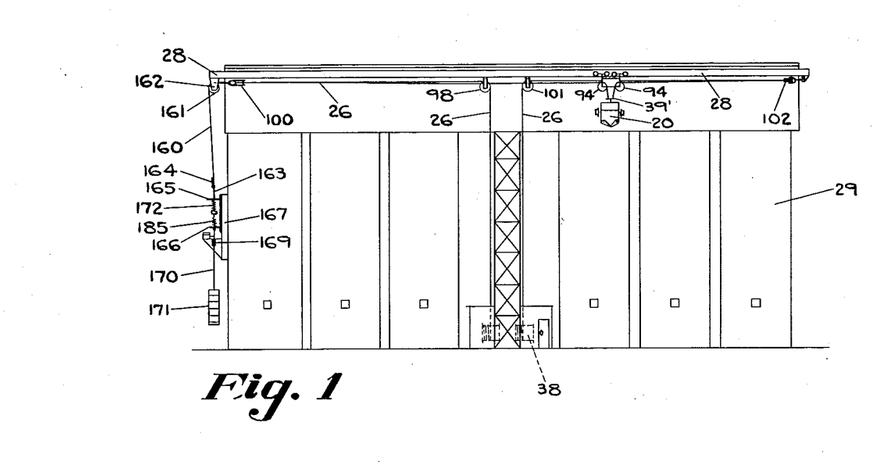
Fig. 1 is a diagrammatic illustration of a complete installation showing a plurality of silos for storing coal or other material.
Figure 1A:
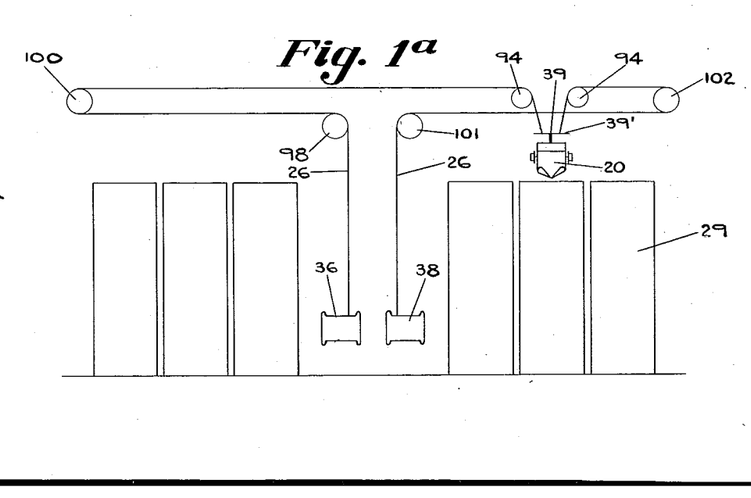
Fig. 1a is a diagrammatic view to illustrate the single cable for both hoisting and traversing purposes.
Figure 2:
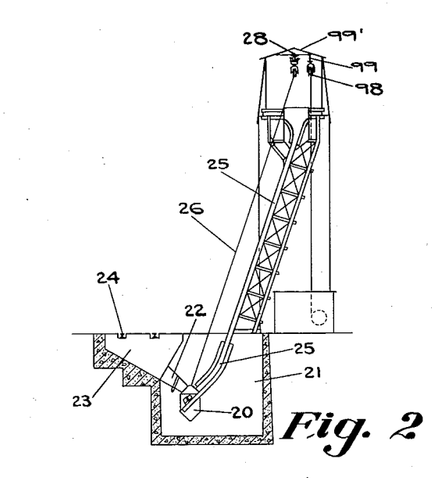
Fig. 2 is an end elevation of a portion of the apparatus shown in Fig. 1.

Referring to Figs. 1 and 2 a bucket 20 is shown in a pit 21 in position to receive material through a gate controlled chute 22 from the hopper 23 which is adapted to receive the material from a railroad car (not shown) on the track 24.

An inclined guiding track 25 extends from the pit 21 to an elevated position. A hoisting cable 26 is connected to the bucket 20 and to the hoisting drum 38 as illustrated in Fig. 1. When the bucket reaches the upper limit of its travel above the pit 21 the hoisting operation is stopped automatically and this is followed by movement of the bucket 20 along the monorail 28 until it is over a previously selected silo 29. Preferably the silos are arranged symmetrically with respect to the guiding structure 25 and the pit 21. In Fig. 1 there are shown six silos, three on one side of the pit 21 and three on the other side thereof. The number of silos may be varied as desired.

Figure 3:
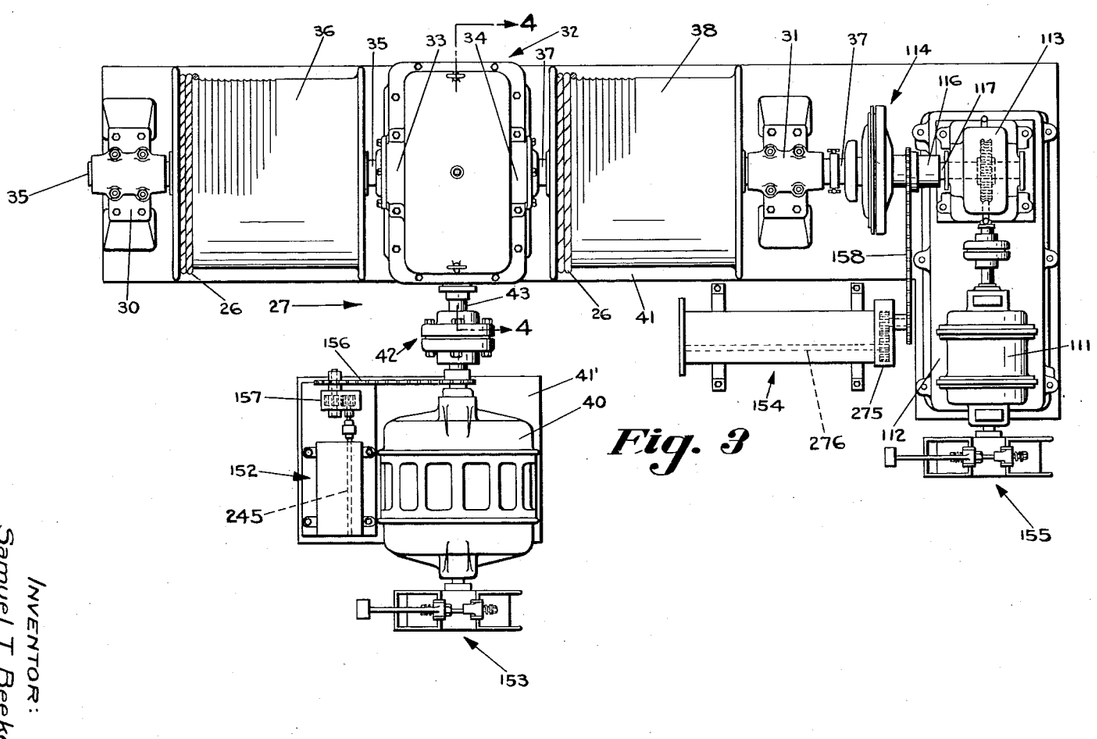
Fig. 3 is a plan view of the hoisting and traversing apparatus.

Referring to Fig. 3 the hoisting engine 27 comprises two hoisting drums 36 and 38 with differential power transmission mechanism 32 between the same and a hoisting motor 40 connected to the power transmission mechanism. Suitable bed plates 41, 41' secured to foundations in the usual manner may be used for supporting the hoisting engine.

Upon the base 41 are mounted the pillow blocks 30 and 31 and the differential power transmission mechanism 32 having the bearings 33 and 34. In the pillow block 30 and the bearing 33 is journaled the shaft 35 to which is keyed the drum 36. In the pillow block 31 and the bearing 34 is journaled the shaft 37 to which is keyed the hoisting drum 38. The hoisting drums 36 and 38 are power operated to wind in or pay out the cable 26 which is composed of two strands but arranged as a single cable, one end of one strand being connected to the drum 36 and one end of the other strand being secured to the other drum 38. The two strands of cable 26 are trained about sheaves, as will be more fully hereinafter described, and secured to a bracket 39 of the bucket 20 as shown in detail in Fig. 8 and diagrammatically in Figs. 1 and 1ª. When the hoisting motor 40 is operated, the differential power transmission mechanism 32 will rotate both of the drums 36 and 38 in the same direction to effect hoisting of the bucket from the pit 21 or from the interior of a silo 29.

The hoisting motor 40 which is mounted on the bed plate 41' is directly connected by a coupling 42 to a shaft 43 mounted in the bearings 44 and 45 of the housing 32' enclosing the differential gear mechanism.

Figure 4:
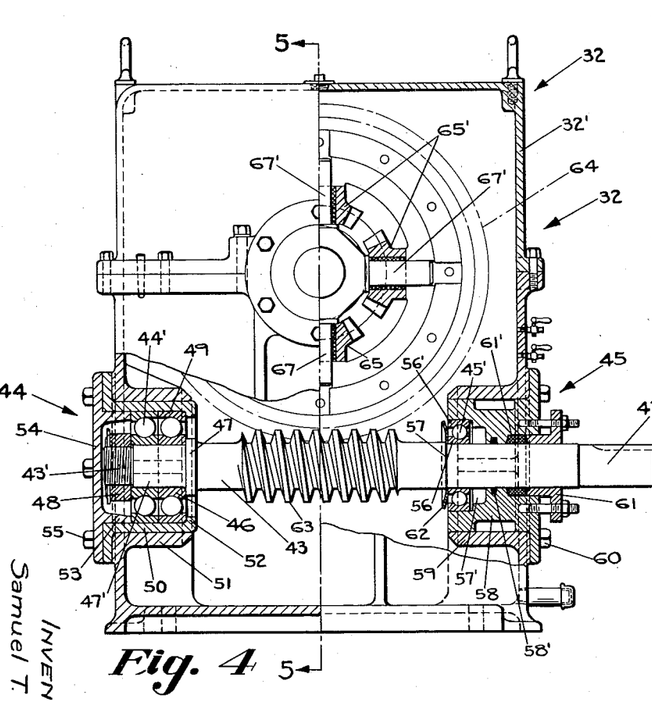
Fig. 4 is a sectional view taken on the line 4—4 of Fig. 3 looking in the direction of the arrows.

The bearings 44 and 45 are preferably provided with constant lubrication as the differential gearing may be subjected to heavy loads during operation of the hoisting and conveyor system. The bearing 44 is a double ball thrust bearing as shown at 44'. The inner race 46 is mounted on the shaft 43 and held between an annular shoulder 47 on the shaft 43 and a lock nut 48 screw threaded onto the left hand end 43' of the shaft 43 as shown in Fig. 4.

The outer race 49 is mounted in a cup shaped sleeve casting 50 seated in an inwardly extending apertured boss 51 of the differential gear housing 32'. The outer race 49 may be in two sections and so also the inner race 46 as shown in Fig. 4. The outer race is held between an annular flange 52 of the sleeve 50 and an annular extension 53 of a cover plate 54 which is fixed to the casing 32' by a plurality of cap screws 55. These cap screws also prevent the sleeve 50 from rotating in the supporting boss 51.

To disassemble the double thrust bearing 44 for inspection or repair only the cap screws 55 need be removed whereupon the lock nut 48 may be released and the two sections of the ball bearing 44' removed from the journal 47' of the shaft 43.

The bearing 45 at the opposite end of the shaft 43 differs from the bearing 44 because the shaft 43 must extend through it. The ball bearing 45' comprises an inner race 56 mounted on the shaft 43 against a shoulder 57 and the outer race 56' is mounted in a counterbore of the sleeve or closure member 58 which fits inside of the apertured boss 59 of the casing 32' and is fixed thereto by the cap screws 60.

Figure 5:
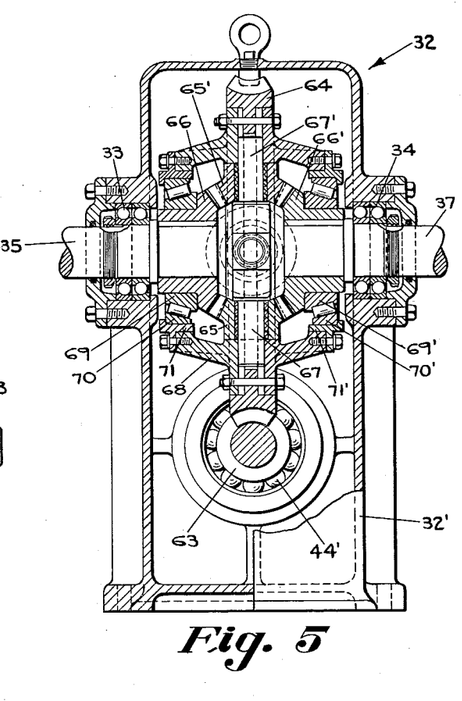
Fig. 5 is a sectional view taken on the line 5—5 of Fig. 4 looking in the direction of the arrows.

A packing gland 61 is associated with the packing 61' as shown in Fig. 4 to cooperate with the packing 58' to prevent egress of oil from the oil chamber 57'. An oil ring 62 may be provided to assure the directing of oil to the bearing 45'. In order to remove the bearing 45 only the cap screws 60 need be removed whereupon the sleeve 58 may be slid out of the cylindrical boss 59. The bearing 45' comprising the inner and outer races 56 and 56' may be removed with the sleeve 58 from the shaft 43 or taken off the shaft 43 individually. Prior to removing the sleeve 58 the packing gland 61 may be loosened to facilitate sliding of the packing 61' off the shaft 43. Mounted on the shaft 43 is a worm 63 which meshes with a worm wheel 64. Bevel gears 65, 65' are rotatably mounted on studs 67, 67' of the spider casting 68, said gears 65, 65' meshing with bevel gears 66 and 66' fixed to the ends of the shafts 35 and 37, respectively. Mounted upon the hubs of the gears 66 and 66' are inner races 69, 69' of a pair of thrust roller bearings the outer races 70, 70' of which are carried by the annular member 71, 71' bolted to the spider 68 as shown in Fig. 5. The arrangement is such that the worm wheel 64 is mounted concentric with the axes of the shafts 35 and 37 and all of the gearing is properly meshed.

The hoisting drums 36 and 38 as shown in Fig. 3 are mounted on the shafts 35 and 37 for rotation therewith. If the motor 40 is operated to drive the worm 63 the drums 36 and 38 will both be rotated in the same direction. According to the direction of the motor 40 the cable 26 will be wound up or paid out to elevate or lower the bucket 20. It can readily be seen by referring to Fig. 5 that since the bevel gears 66 and 66' are keyed to the shafts 35 and 37 to rotate therewith, rotation of the worm wheel 64 by means of the worm 63 will effect rotation of the shafts 35 and 37, both in the same direction, by reason of the connections between the worm wheel 64 and the bevel gears 66 and 66' through the bevel gears 65, 65' notwithstanding the fact that the latter are mounted for rotation on the shafts 67 and 67' relatively to the spider casting 68.

Figures 8, 9:
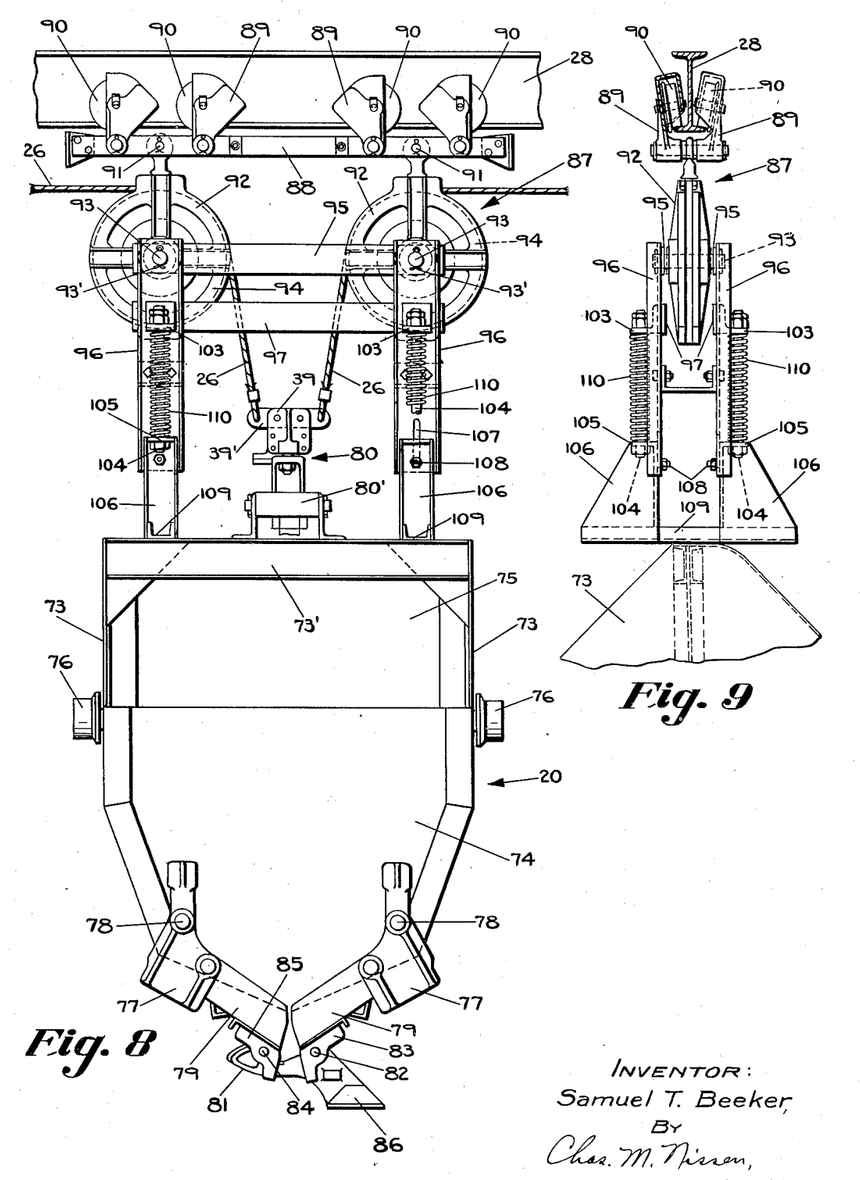
Fig. 8 is an elevational view of a bucket and a traversing carriage connected to a trolleyway.
Fig. 9 is an end view of the carriage shown in Fig. 8.

When the bucket 20 is elevated along the guideway 25 it is disconnected from the trolley carriage. The bucket 20 may be like that shown in the Macy Patent 1,772,777, granted August 12, 1930, for an improvement in Hoisting buckets. The bucket 20 as shown in Fig. 8 comprises end walls 73 and side walls 74. The bucket 20 has a hooded top with an opening 75 through which the bucket may be loaded. Guide rollers 76, 76 are located at the sides of the bucket to guide it up and down the runway from the pit where it is loaded, said rollers 76 serving to support the bucket while it is being loaded.

Brackets 77, 77 fixed to the side walls of the bucket 20 carry pins 78, 78 on which are pivotally mounted the swinging doors 79, 79 which when closed form the bucket bottom. The doors 79 are urged to open positions by their own weight and the weight of the material in the bucket.

The bracket 39 at the top of the bucket serves to connect the strands of the cable 26. The ends of the strands being connected to the bracket 39 by means of the cross piece 39' there is no interruption in the continuity of the cable 26 and consequently only a single cable is in fact employed.

The bracket 39 is connected through the swivel 80 to the link 80' which is in turn connected to door closing mechanism such as that shown in the Macy Patent 1,772,777 and therefore no further disclosure is deemed necessary.

A latch 81 pivoted on a pin 82 mounted in a casting 83 attached to one of the doors 79 is adapted to engage a pin 84 carried by a similar casting 85 attached to the other door 79. This latch is provided with a foot 86 which is of sufficient weight and so positioned relative to the pivot pin 82 that the latch will be moved to latched position when the bucket is lifted while empty and the foot 86 is freed from coal or other material in the silo.

The foot 86 is also adapted to disengage the latch 81 from the pin 84 when the bucket is lowered into the silo and the foot 86 engages material previously delivered to the silo. In other words, when the bucket is lowered into a silo with the door 79 closed and the bucket containing a load of material, such load will be discharged when the foot 86 strikes the material which has been previously loaded into the silo. After the doors 79 have been opened automatically by the foot 86 striking previously loaded material in the silo and the bucket is lifted the closing of the doors 79 is retarded as illustrated in the Macy Patent 1,772,777 so as to assure discharge of all material from the bucket.

Positioned above and supported by the silos 29 is a monitor or housed trackway in which is positioned the monorail or track 28 extending from one end to the other of the whole row of silos, as illustrated in Fig. 1. The track is illustrated in Figs. 2, 8, 9 and 12 to 16, inclusive, in the form of an I-beam 28. A carriage 87 is adapted to be propelled along the I-beam 28 when the bucket 20 is in its elevated position and connected to the carriage.

The carriage 87 comprises a pair of longitudinally extending bars 88 to which are pivotally attached a plurality of roller brackets 89 arranged in pairs on opposite sides of the I-beam track. Each of the roller brackets 89 comprise a single flanged roller 90 adapted to travel along the I-beam track 28 as illustrated at the upper portion of Fig. 9.

Suspended from the pivot pins 91 which are mounted in alined apertures of the bar 88 is a pair of sheave housings 92, 92 having sheave pins 93, 93 on which are mounted the sheaves 94, 94. The sheave housings 92 are connected by a pair of bars 95, 95, said bars being mounted on the sheave pins 93.

Depending from and pivotally mounted on the pins 93 are two pairs of channels 96, 96 connected together below their upper ends by means of the bars 97, 97. It will thus be seen that the sheaves 94 are suspended by means of the sheave housings 92 from the longitudinal bars 88 and that the latter are suspended by means of the trolley wheel mechanism shown from the I-beam track 28. The sheave pins 93 extend through openings in the upper ends of the channel members 96 and cotter pins 93' are relied on to keep the sheave pins 93 in proper position relative to the channel members 96. The channel members 96 with the cross bars 95 and 97 secured thereto constitute a frame to the upper corners of which are connected the sheaves 94 for rotation on the axes of the sheave pins 93.

The cable 26 which is secured to the hoisting drum 36 extends upwardly to a sheave 98 as shown in Fig. 1. The sheave 98 is swingably hung from a truss 99 secured to the roof 99' in a position spaced back of the track I-beam 28 as shown in Fig. 2. The cable 26 extends from the sheave 98 to the left-hand end of the track 28 as shown in Fig. 1 where it passes around a sheave 100 and thence back to the sheave 94 and down to the cross piece 39' and the bracket 39 on top of the bucket 20 as shown in Fig. 8. Fig. 1ª shows diagrammatically the manner in which the strand of the single cable 26 extends from the drum 36 to and around the sheaves 98, 100 and 94 to the top of the bucket 20.

The other strand of the single cable 26 that is secured to the drum 38 extends upwardly to a sheave 101 suspended in the same manner as sheave 98 in a position where it will not interfere with the traversing or trolley movements of the bucket 20 along the path extending over the tops of the silos.

From the sheave 101 the cable 26 extends to and around the sheave 102 at the right hand end of the installation shown in Fig. 1. The cable 26 extends from the sheave 102 to the right hand sheave 94 shown in Fig. 8 and thence downwardly to the bracket 39 on top of the bucket 20.

While two separate strands of cable are illustrated one extending from the hoisting drum 36 and the other extending from the hoisting drum 38, it should be understood that the connection to the bracket 39 may be made without interrupting the cable. For instance, the bottom of the cross piece 39' may be grooved and an opening provided through the bracket 39 for the passage of the single strand 26 along such groove. It should be particularly noted that the single cable is used for both elevating the bucket and moving it along the horizontal trackway so as to position the bucket over any one of the silos. From its position over a predetermined silo the bucket may be lowered into the silo by means of the same cable.

As shown in Figs. 8 and 9 angle clips 103, 103 are secured by means of riveting or welding to the channels 96 a short distance below the sheave pins 93. Slidably extending through apertures in the angle clips 103 are rods 104 the lower ends of which extend through apertures of the angle plates 105, 105 fixed to the upper ends of a pair of plates 106 adapted to slide vertically between the flanges of the channel bars 96 as shown in Fig. 8.

Vertical slots 107 in the channels 96 are adapted to receive bolts 108 to vertically guide the plates 106 along vertical channels 96. Cross channels 109 connect the lower ends of the plates 106 and provide feet or abutments against which the bucket may strike when it is elevated to its uppermost limit.

Encircling the rods 104 are springs 110, 110 positioned between the plates 105 and the angle clips 103 in such manner that when the abutments 109 are struck by the upper cross piece 73' of the bucket the shock will be absorbed. In other words, the springs 110 and the mechanism associated therewith act as a buffer to cushion the stopping of the bucket at its upper limit of travel. Such buffer mechanism is desirable because the bucket is at certain times loaded when reaching its upper limit of travel and at other times it is empty and moreover the bucket may be operating at varying speeds when loaded and when empty.

In order to utilize both of the drums 36 and 38 for horizontal travel or traversing of the bucket along the I-beam track 28 such drums must be rotated in opposite directions. That is to say, while for elevating purposes the drums are both rotated in the same direction, they must be rotated in opposite directions when traversing of the bucket along the track 28 is to be effected.

A separate motor 111 serves as a trolley motor or traversing motor. The motor 111 is connected to and disconnected from the shaft 37 of the drum 38 by means of the electro-magnetic clutch shown in Fig. 6. When the motor 111 is connected to the drum 38 by means of the electro-magnetic clutch so as to apply power to such drum the power transmission differential gearing 32 will effect rotation of the drum 36 in a direction opposite from the direction of the rotation of the drum 38. When the trolley motor or traversing motor 111 is operated the hoisting motor 40 remains stationary and therefore the worm gearing 63, 64 which is self-locking holds the worm wheel 64 locked in stationary position. Consequently when the shaft 37 is rotated the gear 66' will be rotated and the planetary gears 65, 65' as shown in Figs. 4 and 5 will rotate on stationary shafts or bearings 67, 67'. Such bearings will be stationary because the worm wheel 64 when locked in stationary position also locks the spider frame 68 in stationary position together with the bearings 67, 67' mounted thereon. Rotation of the planetary gears 65, 65' on fixed axes will effect rotation of the bevel gear 66 and consequently of the shaft 35 in a direction opposite to the direction of rotation of the shaft 37.

Figures 6, 7, 7A:
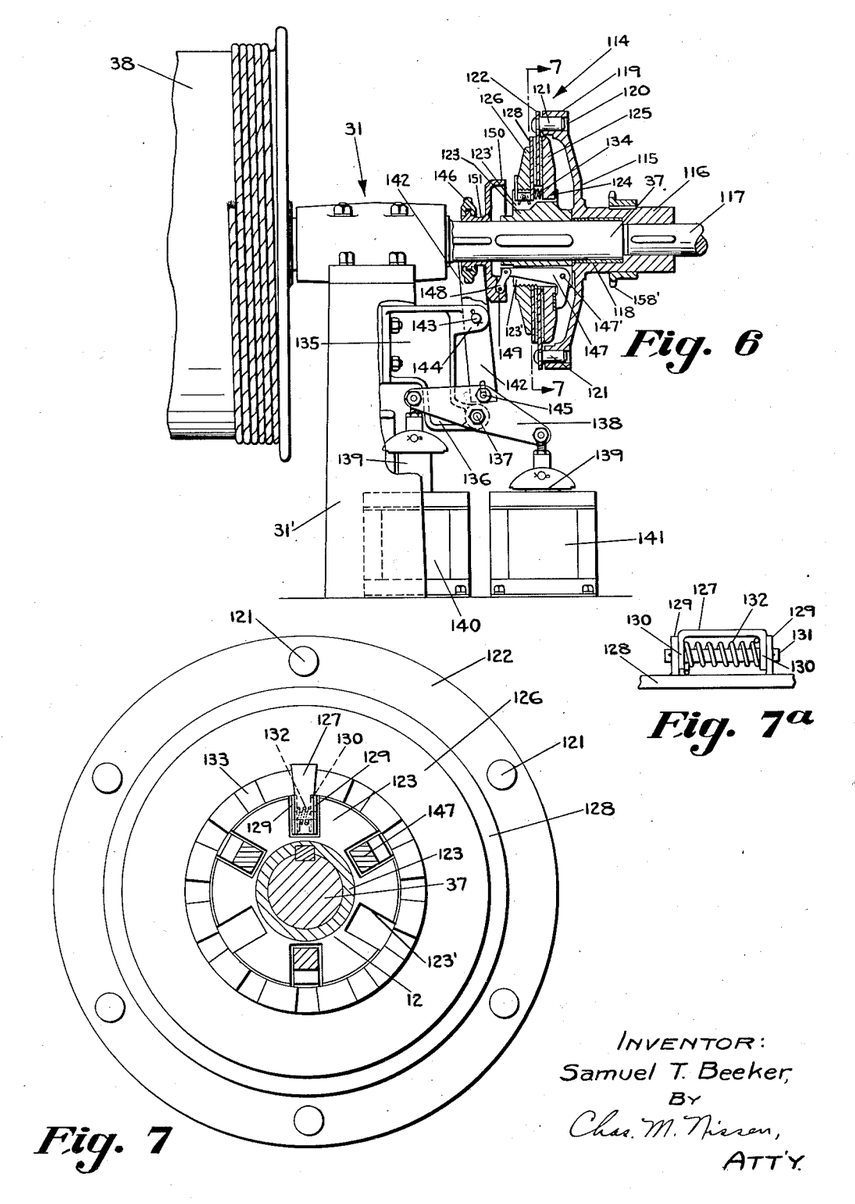
Fig. 6 is a side elevation of a portion of Fig. 3 with certain parts broken away to show the clutch mechanism which is electro-magnetically operated to connect the traversing motor to the hoisting drums.
Fig. 7 is a sectional view taken on the line 7—7 of Fig. 6 looking in the direction of the arrows.
Fig. 7a is an enlarged view of a portion of Fig. 7.
Figure 17:
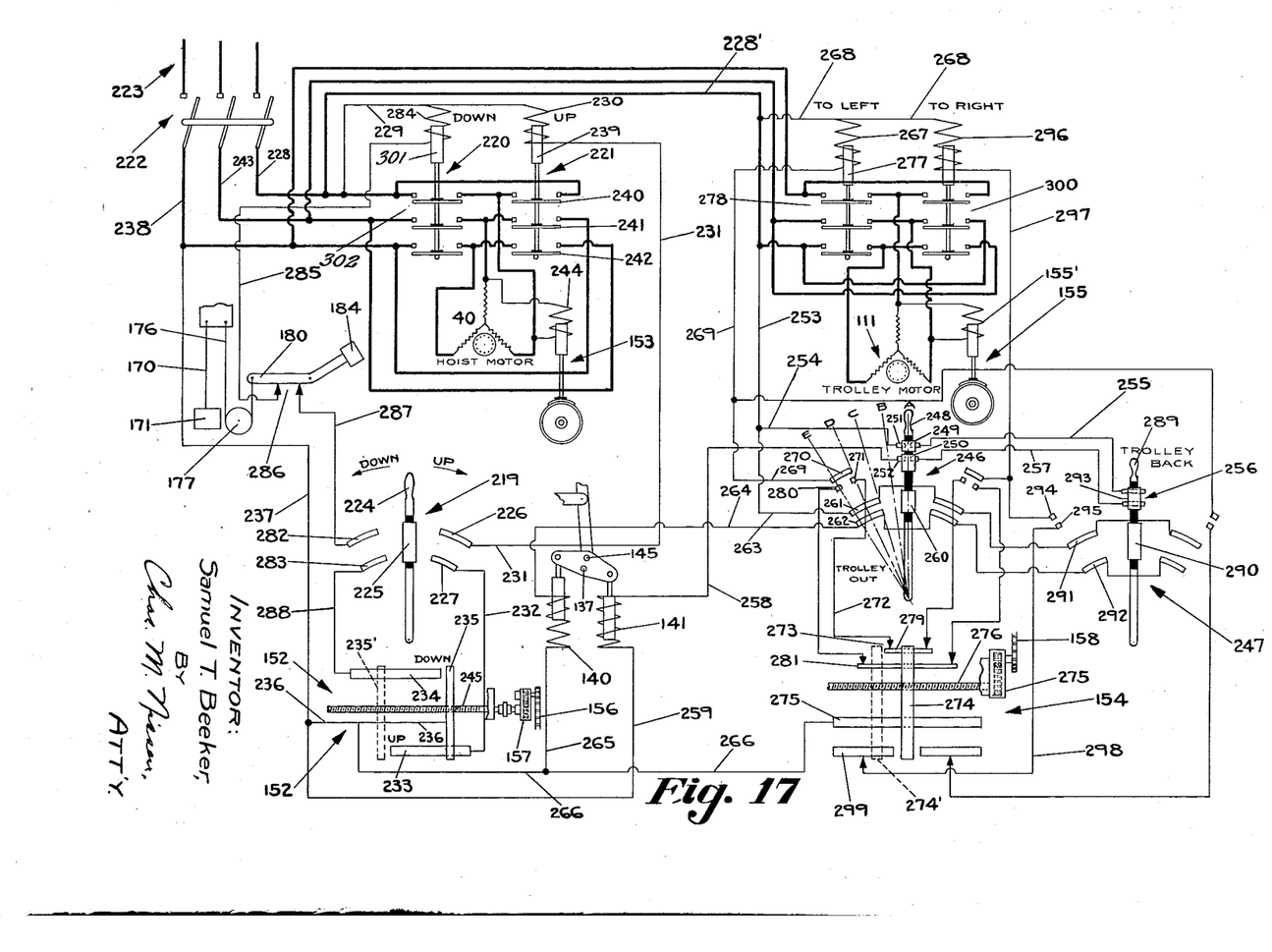
Fig. 17 represents a wiring diagram of an electric system of control of the hoisting and traversing motors.

The trolley motor 111 may be mounted on a bed plate 112 as shown in Fig. 3. A worm gear reducer 113 may be connected to the outer end of the shaft 37 by means of the clutch 114 which may be electro-magnetically operated as illustrated in Figs. 6 and 17. When the shaft 37 is connected to the traversing motor or trolley motor 111 by means of the clutch 114 the drum 38 will be rotated in one direction or the other depending upon the direction of rotation of the trolley motor 111. The direction of traversing travel of the bucket may therefore be controlled by controlling the direction of rotation of the trolley motor 111.

The clutch 114 may be of any suitable type and size so as to be efficient both as to capacity and effectiveness in the desired operation of the bucket in the system illustrated in Figs. 1, 2 and 3. The clutch 114 may be of the friction type comprising a driving member 115 having a hub 116 keyed to the end of the shaft 117 for rotation thereby. A bushing 118 inserted in a counterbore of the hub 116 provides a bearing for the end of a shaft 37 and thereby alines said shafts 37 and 117.

Extending around the periphery of the member 115 is a flange 119 provided with a plurality of apertures 120 adapted to slidably receive a plurality of pins 121 which are carried by a circular flat steel plate 122 in such manner that the latter will be rotated by said driving member 115.

A hub 123 keyed to the shaft 37 is provided with a series of slots 123' along which are slidably mounted for rotation with the hub 123 an annular ring 125. This ring is provided with keys 124 adapted to register with the slots 123' of the hub 123.

The outer surface of the hub 123 is provided with screw threads upon which is threaded an annular ring 126. It will thus be seen that the annular ring 126 is rigidly connected to the hub 123 to rotate bodily therewith but the annular ring 125 being provided with keys 124 which slide along the longitudinal slots 123' in the hub 123 is movable toward and from the ring 126, but is prevented by the bell crank levers 147 from moving beyond a predetermined distance from the ring 126.

The inner faces of the rings 125 and 128 are faced with fibre friction plates so that when one ring is moved toward the other the rings 125 and 126 will grip the steel plate 122 thereby clutching or connecting the driving member 115 and the shaft 117 to the hub 123 and shaft 37 to drive the latter.

As shown in Fig. 6 a bracket 135 is secured to the standard 31' of the pillow block 31. Pivoted at 137 to the arm 136 of the bracket 135 is a double arm lever 138 to the ends of which are pivotally connected depending plungers 139, 139 which are adapted to extend downwardly into the solenoids 140 and 141. A lever 142 is pivotally mounted at 143 on the arm 144 of the bracket 135. The lever 142 is pivotally connected at 145 at its lower end to the upper central portion of the lever 138. The pivot 145 is spaced a short distance from the pivot 137.

At its upper end the lever 142 is bifurcated to encircle a clutch shifting yoke 146. A plurality of bell crank levers 147 are each pivotally connected at 147' to the hub 123 and one leg of each bell crank lever is mounted in position to move the annular ring 125 toward the other ring 126 by sliding the keys 124 along the slots 123', when said bell crank levers are rocked on their pivots 147'.

In order to adjust the clutch mechanism without interfering with the pivotal movements of the bell crank levers 147 provision is made for adjusting the ring 126 on its thread connection to the hub 123 so as to hold and lock the ring in adjusted position. The ring 126 is provided with a plurality of radial slots or grooves 133 into any one of which the latch 127 is adapted to be moved by means of the spring 132 which is mounted on the rock shaft 131 between the lugs 130 of the latch 127 as shown in Fig. 7a. The rock shaft 131 is journaled in the spaced apart lugs 129 secured to the steel plate 128. Since the lugs 129 project into one of the slots 123' as shown in Fig. 7 the steel plate 128 while slidable longitudinally of the hub 123 must rotate bodily therewith at all times. By releasing the latch 127 from its groove 133 the ring 126 is released for rotary adjustment relatively to the hub 123. In this manner the ring 126 and the steel plate 128 may be moved toward or from the ring 125 while the compression springs 134 spaced at intervals around the hub 123 tend to spread the plate 128 and the ring 125 apart. To the left-hand ends of the bell crank levers 147 are connected the levers 148 which are mounted upon pins 149 carried by the flanges 150 of the clutch shifter 151.

When the solenoid 140 is energized and its plunger 139 pulled down the lever 138 by reason of its pivotal connection at 145 to the lever 142 will rock the latter on its pivot 143 and consequently the clutch will be applied by moving the ring 125 toward the ring 126 to firmly grip the plate 122. When the solenoid 140 is de-energized and the solenoid 141 is energized the clutch will be moved to released position and the springs 134 will spread the rings 125, 126 apart.

When the bucket 20 enters the pit 21 to receive its load it is guided toward the chute 22 and seated upon the rollers 76 in position for the chute 22 to deliver material from the hopper 23 to the upper open side of the bucket. The operation of the bucket when receiving a load while occupying its lowermost position in the pit 21 as shown in Fig. 2 may be as described in the Macy Patent 1,705,986, granted March 19, 1929, for an improvement in Bucket controlled spouts.

Electric limit switches of the usual and well known type provided in hoisting systems may be provided to automatically stop the bucket when it reaches its lowermost limit of travel and for automatically stopping the bucket when it reaches its uppermost limit of travel. Such a limit switch is diagrammatically illustrated at 152 in Fig. 17. Such limit switch permits elevation of the bucket to a position adjacent the carriage and automatically stops the hoisting motor 40 and applies the brake 153 to hold the motor stationary together with the self-locking worm gearing comprising the worm 63 and the worm wheel 64.

The arrangement is also such that when the solenoid 141 is de-energized and the solenoid 140 is energized to effect the application of the clutch 114 to connect the motor 111 to the drum 38 the direction of travel of the bucket will be longitudinal of the I-beam track to any selected one of the silos 29. Upon reaching the point immediately above the previously selected silo the travel limit switch 154 shown in Figs. 3 and 17 will be operated to automatically stop the trolley motor 111, de-energize the solenoid 140 and energize the solenoid 141 to release the clutch 114. The motor 40 may then be operated to lower the bucket into the predetermined silo by paying out the cable 26 from both of the hoisting drums 36 and 38.

When the foot 86 shown in Fig. 8 reaches the pile of material in the selected silo the latch will be disengaged and continued downward movement of the bucket will cause slack in the cable 26.

Figure 10:
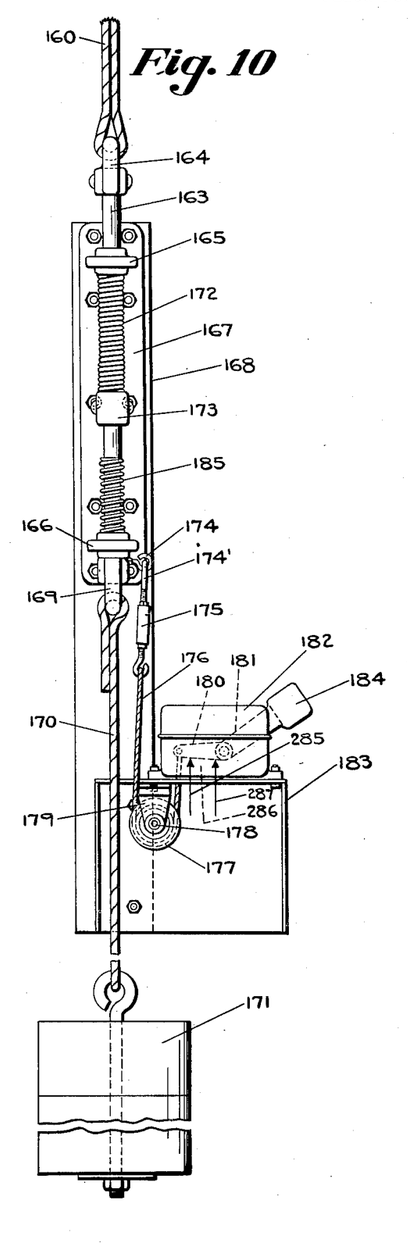
Fig. 10 is an elevational view of the slack cable switch mechanism.
Figure 11:
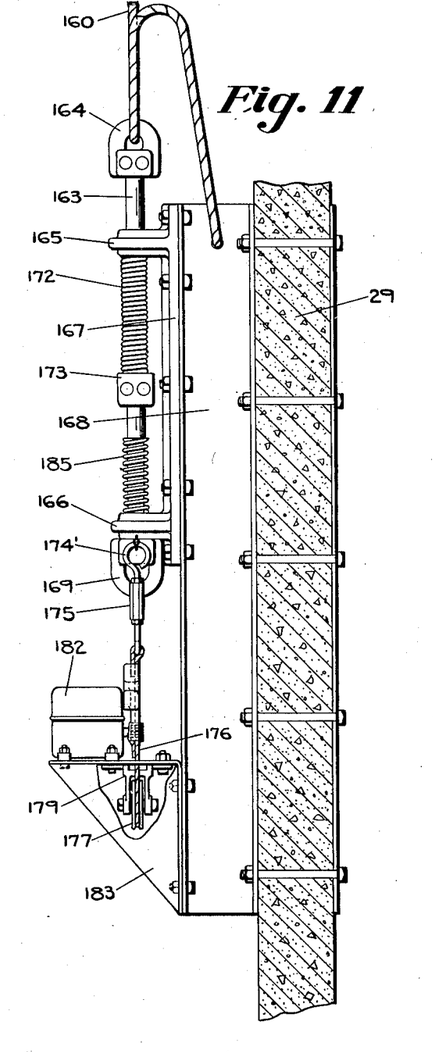
Fig. 11 is a side view of Fig. 10.

By means of the slack cable switch and the mechanism associated therewith as shown in Figs. 10 and 11 the current to the hoisting motor will be cut off and the brake 153 applied to stop the same. Now upon reversing the current through the motor 40 and releasing the brake 153 the motor 40 may again be operated to wind the cable 26 on the two drums 36 and 38 to effect lifting of the bucket out of the silo. When the bucket reaches its upper limit of travel at the top of the silo against the carriage 87 the limit switch 152, shown in Figs. 3 and 17, will operate to stop the motor 40 and apply the brake 153. Then by operating the motor 111 to trolley the bucket back to its position over the top of the pit the bucket will be moved until it reaches such position when it will be automatically stopped by the limit switch 154, the clutch 114 being released and the motor 111 stopped by having the current cut off from the same and the brake 155 applied. The bucket may then be lowered along the guideway 25 to complete the cycle of operations, the limit switch 152 being again relied on to automatically stop the bucket at its lower limit of travel in the pit 21.

The limit switch 152 is geared to the armature shaft of the motor 40 through a chain and sprocket wheel connection 156 and a speed reducer 157. This limit switch may be set so that after a given number of rotations of the motor it will permit a predetermined elevation of the bucket when said limit switch will operate to automatically interrupt the current to the motor and effect application of the brake 153.

The limit switch 154 is geared to the motor 111 through the chain and sprocket connection 158, one sprocket 158' of which is fixed to the hub 116 and the clutch member 115 as shown in Fig. 6. The sprocket 158' is therefore keyed to the hub 116 and the latter is keyed to the shaft 117. The limit switch is so adjusted that the traversing motor 111 will be automatically stopped when the bucket reaches the desired silo and in reversed movement or trolleying back the bucket will be automatically stopped when it arrives at a position immediately above the pit.

The slack cable take-up and switch mechanism illustrated in Figs. 10 and 11 cuts off the power to the hoisting motor 40 when the bucket is lowered to the top of the pile in the silo. As shown in Fig. 1 the slack cable mechanism is attached to the left-hand end silo and immediately below the left-hand end of the horizontal track 28.

Connected to the sheave 100 is a cable 160 which extends around a sheave 161 carried by a bracket 162 fixed to the end of the track 28. The cable 160 then extends downwardly and is attached to the upper end of the rod 163 by means of an eye 164. The rod 163 is slidably supported in apertures of a pair of lugs 165 and 166 cast integral with the base 167 which may be fixed to a channel support 168 which in turn is mounted upon the end silo 29 as illustrated in Fig. 11. The lower end of the rod 163 is provided with an eye 169 to which is fixed one end of a cable 170 and at the lower end of the latter is carried a counter-weight 171 of sufficient weight to take up the slack in the cable 26 which is caused by the bucket settling on the pile of material in the silo.

A spring 172 encircles the rod 163 and is positioned between the lugs 165 and a collar 173 fixed to said rod 163 about midway between the lugs 165 and 166 said spring being adapted to relieve the shock or strain on the cable 26 incident to vertical movement of the bucket when the latter is lifted at any time from its lowermost position in the pit 21 or its lowermost position in the silo.

Fixed to the eye 169 by means of a pair of hooks 174 and 174' and a take-up nut 175 is a cable 176 which extends downwardly around a sheave 177 and thence upwardly to the slack cable switch. The sheave 177 is pivoted at 178 to the bracket 179.

The cable 176 after passing around the sheave 177 is connected to the arm 180 of the switch lever 181 pivotally mounted in the housing 182.

The slack cable switch mechanism is mounted on a bracket 183 fixed to the channel member 168 and electrically connected with the circuits in such manner that when the slack in the cable 160 occurs the counter-weight 171 moves the rod 163 downwardly thereby relieving the tension on the cable 176 and permitting the counter-weight 184 to open the slack cable switch 180 and thereby stop the hoisting motor as more fully hereinafter explained in connection with the description of the wiring diagram shown in Fig. 17.

A spring 185 encircling the rod 163 and positioned between the lower lug 166 and the collar 173 fixed to the rod 163 is of sufficient length that when the counter-weight 171 moves down to take up the slack in the cable 160 the collar 173 will engage the top of the spring 185 and absorb the shock.

It will thus be seen that when slack in the cable 160 occurs the spring 172 under compression coacts with the counter-weight 171 to move the collar 173 down against the buffer spring 185. At the same time the eye 174' is moved down to permit the weight 184 to open the switch 180.

Figure 12:
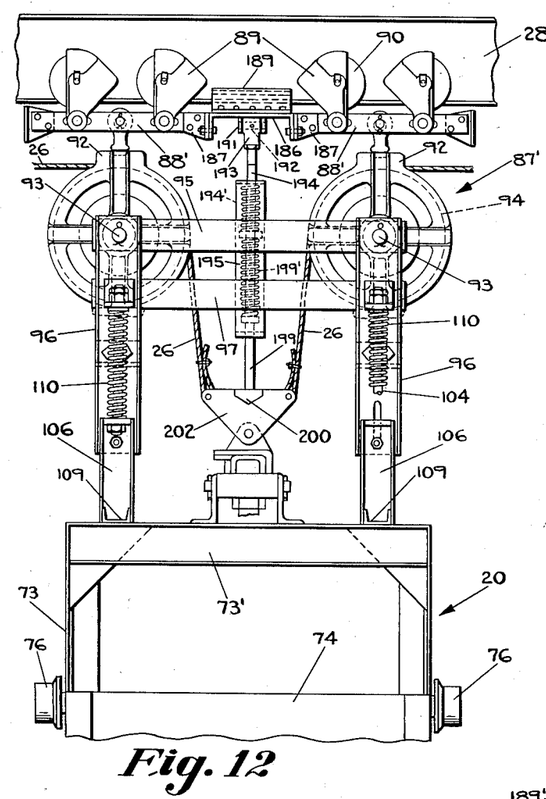
Figs. 12, 13 and 14 show modifications of the structure shown in Figs. 8 and 9 in that a clamp is included to hold the carriage connected to the trackway when the bucket is away from the carriage.
Figure 13:
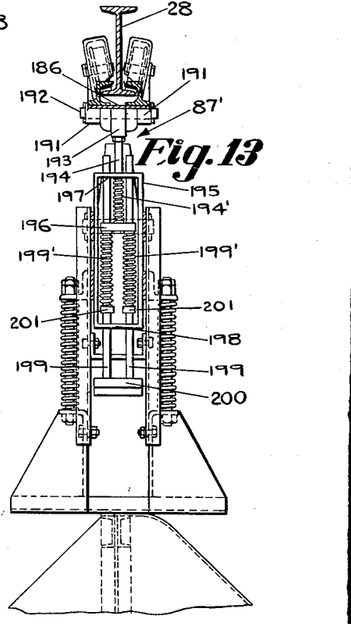
Figure 14:
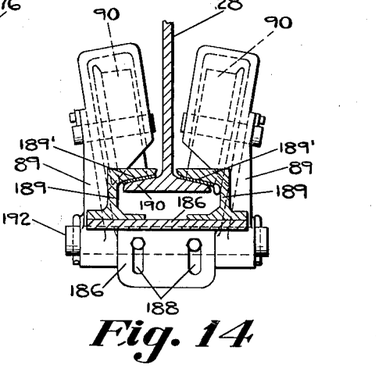

Figs. 12, 13 and 14 show a modified carriage 87' in which means is provided to lock the carriage to the track when the bucket is out of engagement with the feet 109. The longitudinal bars 88' are separated near the middle thereof and provided with an inverted U-shaped plate 186 which is bolted to angle clips 187 fixed to the bars 88'. As shown in the enlarged view in Fig. 14 the plate 186 is provided with spaced-apart elongated vertical slots 188. Fixed to the upper surface of the inverted U-shaped member 186 is a pair of castings 189, 189 so shaped that they conform to the upper surface of the flanges 190 of the I-beam 28.

To the under surface of the U-shaped member 186 is secured a pair of ears 191 which carry a pin 192 in apertures thereof. The pin 192 also extends through an aperture of the T-shaped casting 193 which is fixed to the upper end of a vertical rod 194. The rod 194 extends downwardly through an aperture in the upper wall of a rectangularly shaped box-like member 195 and is fixed at its lower end to a guide shoe 196. A spring 194' encircling the rod 194 and positioned between said shoe 196 and the upper wall 197 of the member 195 tends to hold the casting 189 against the lower flanges of the I-beam 28 in such a manner as to prevent longitudinal movement or creeping of the carriage 87'.

In the lower wall 198 of the box-like member 195 is a pair of apertures which slidably receive the rods 199. A detent 200 connects the lower ends of the rods 199 as shown in Figs. 12 and 13.

Secured to each rod 199 above the lower wall 198 is a collar 201. Between each collar 201 and the guide block 196 are mounted springs 199' which encircle the rods 199 and provide means to yieldably lift the guide block 196.

A slot in the upper side of the bracket 202 conforms to the shape of the detent 200 so that when the bucket reaches its uppermost limit of travel the detent 200 will be properly guided into said slot. When this occurs the rods 199 are lifted and at the same time the collars 201 are lifted off the cross piece 198 thereby compressing the springs 199' and moving upwardly the cross piece 196 which in turn moves upwardly the rod 194 against the action of the spring 194'. Thus the members 189 are lifted off the upper surface of the flanges 190 of the I-beam 28. The under surfaces of the members 189 may be provided with friction material 189' as shown in Fig. 14, in order to act more effectively as a brake to hold the carriage 87' in its adjusted position while the bucket is lowered below the carriage.

It should be particularly noted that the detent 200 when engaged by the slot in the upper side of the bracket 202 serves not only to move the shoes 189 off the flanges 190 but also coacts with the carriage frame and the auxiliary frame 195 which is secured rigidly to the carriage frame, to prevent the bucket from swinging relatively to the carriage upon stopping the carriage and the bucket after being given a traversing movement along the track 28.

Figures 15, 16:
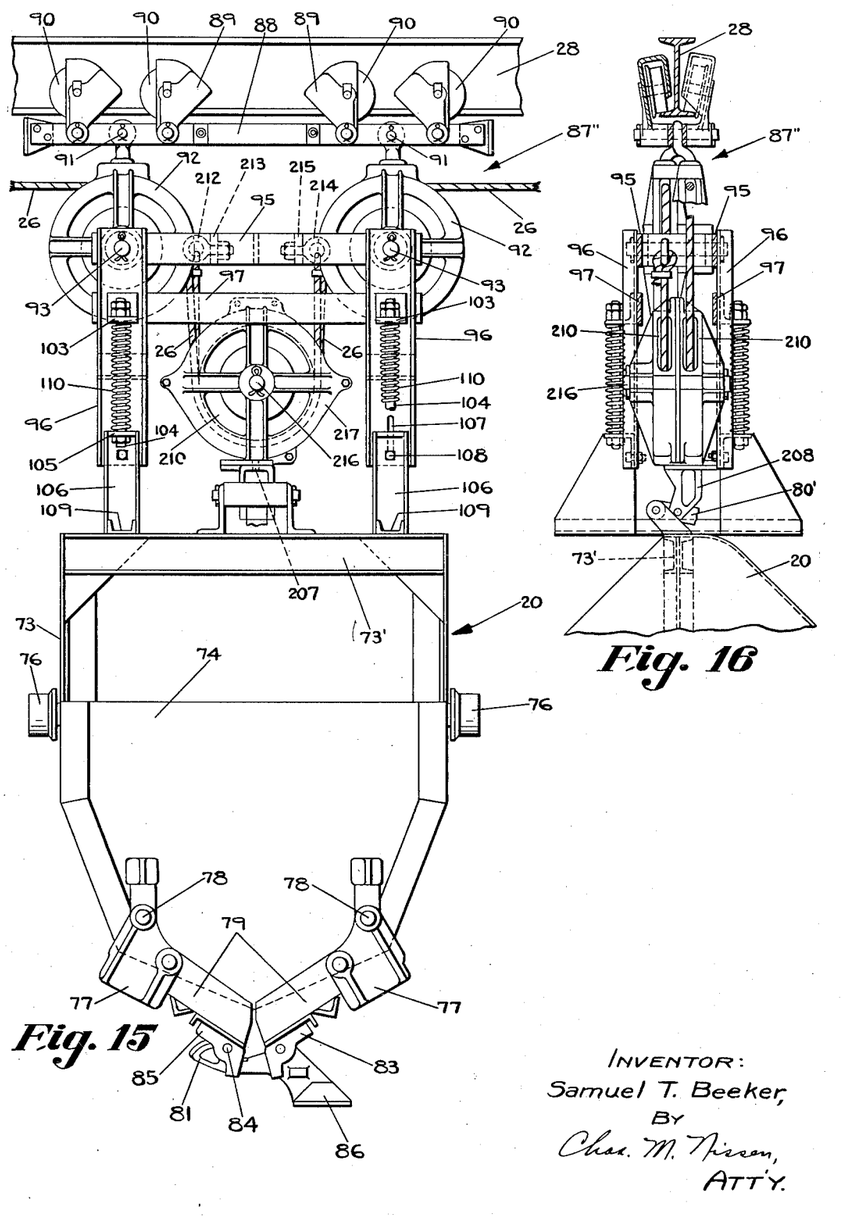
Figs. 15 and 16 are views similar to Figs. 8 and 9 but include another modification.

Figs. 15 and 16 show another modification of the carriage 87''. In this construction the tension on both strands 26 is equalized. The carriage frame comprising the bars 95, 97 and the vertical channels 96 is the same as the corresponding structure in Figs. 8 and 9. However, instead of connecting the ends of the strands to a bracket on top of the bucket the strands are trained around sheaves 210 and extended upwardly to where they are fixed to eyes 212 and 214 as shown in Fig. 15. The eyes 212 and 214 may be secured to the cross bars 95 by means of the members 213 and 215. The sheaves 210 are mounted on a shaft 216 which is journaled in a frame 217. The lower side of the sheave frame 217 is swiveled at 207 to the depending supporting member 208 which is connected to the link 80' and the latter is connected to the top cross beam 73' of the bucket 20 as illustrated in Fig. 8 as well as in Figs. 15 and 16. It can readily be seen that instead of connecting the ends of the strands 26 to the eyes 212 and 214 the rope or cable may be continuous by being passed over a suitable grooved support on the bars 95.

In the structure shown in Figs. 8 and 12 the bucket is supported by a single loop of the single cable when the bucket is lowered from the carriage. In the construction shown in Fig. 15, however, the bucket is supported by two loops of rope or cable when the bucket is lowered below the carriage 87''. Consequently the structure shown in Figs. 15 and 16 is adapted to heavier loads.

Fig. 17 illustrates diagrammatically the circuits, connections and switches which may be used for electrically controlling the hoisting and traversing mechanism and the parts shown connected thereto. The hoisting motor 40, which is provided with the electro-magnetic brake 153, may be an alternating current induction motor controlled by the manual switch 219 and the electro-magnetic up and down reversing switches 220 and 221. A main line switch 222 may be employed for connecting the supply mains 223 to the motor circuits.

The switch lever 224 may be arranged so that when moved in the direction of the arrow marked "up" the insulated conducting bar 225 will connect the stationary segments 226 and 227 thereby completing a circuit between two lines of the main supply circuits.

The circuit may be traced from the supply main 228 through the conductor 229, solenoid 230 of the "up" electro-magnet, conductor 231, segment 226, conducting bar 225, segment 227, conductor 232 to the "up" contact 233 of the hoist limit switch 152. Thence the current continues through the wiping cross piece 235 and conductors 236 and 237 to the supply main 238.

When the solenoid 230 is energized it lifts the plunger 239 to cause the three plates 240, 241 and 242 to connect the fixed contacts adjacent the same and thereby complete the circuit through the hoisting motor 40, to rotate the same in the proper direction for operating both of the hoisting drums 36 and 38 in the same direction and to lift the bucket from the pit 21 along the guideway 25 toward the overhead track 28.

The motor circuits from the supply mains through the motor 40 will be through the conductors 228, 238 and 243 and the switch plates 240, 241 and 242 to the star connected windings of the hoisting motor 40. At the same time the solenoid 244 of the electro-magnetic brake 153, which may be of usual and well known construction, will be energized to effect release of the brake.

As the bucket travels toward the carriage 87 at the track 28, shown in Figs. 8 and 9, the sprocket chain 156 will be driven in synchronism with the hoisting motor 40 and the hoisting drums 36 and 38. The reduction gearing 157 is such that it will operate the screw threaded rod 245 to cause the wiper cross piece 235 to move off the fixed contact 233 to the dotted line position 235' shown in Fig. 17 at the time that the bucket reaches its uppermost limit of travel above the pit 21 or at the time that the upper cross beam 73' of the bucket strikes the buffer mechanism of the carriage 87.

When the "up" limit switch operates, the circuit through the solenoid 230 is interrupted and thereupon the motor switch is opened and the solenoid 244 is de-energized to cause the spring of the brake 153 to apply the latter and thereby stop the hoisting motor.

When the bucket reaches the upper limit of its travel above the pit 21 and the brake 153 is applied to stop the hoisting drum, the switch lever 224 must be moved back to its central position.

In Fig. 17 three manually operated switches are shown, one designated 219 for controlling the hoisting and lowering of the bucket, another designated 246 for controlling the traversing movements out from the top of the pit along the trolley track; the third switch designated 247 is for the purpose of controlling the return traversing movements of the bucket along the trolley track. The switch 246 may be termed the "Trolley out" switch. The switch 247 may be termed the "Trolley back" switch. The three switches 219, 246 and 247 may be mechanically interlocked so that when any one of them is moved from its central position, the other two are locked in their central positions. In other words, no switch lever can be moved from its central position unless the other two are in their central positions.

Assuming that the bucket has been moved from the pit 21, to its uppermost limit of travel and automatically stopped there by the opening of the limit switch 233, 235, the switch lever 224 is moved to its central position shown in Fig. 17. The switch lever 248 is then moved to the position indicated by the dotted line B. Such positioning of the switch lever 248 will move the insulated conducting contacts 249 and 250 from the stationary contacts 251 and 252 below the same. Such opening of the switches 251 and 252 will interrupt the circuit of the solenoid 141. So long as the switch lever 248 is in central position and the main line switch 222 is closed a circuit through the solenoid 141 is established from the supply main 228' to the conductors 253, 254, switch 251, conductor 255, switch 256, conductor 257, switch 252, conductor 258, solenoid 141, conductors 259 and 237 to another supply main 238.

When the solenoid 141 is de-energized by movement of the switch lever 248 to its position B, the clutch shown in Fig. 6 will be in readiness to be applied.

Now upon further movement of the switch lever 248 to its position C the contactor 260 will connect the segments 261 and 262 to establish a circuit through the solenoid 140 which is shown in Fig. 6 arranged for the purpose of applying the clutch. It should be particularly noted that the position C of the switch lever 248, is such that the clutch 114 will be applied to connect the traversing motor or trolley motor 111 to the hoisting drum 38 before the motor 111 is started.

The circuit established by the lever 248 in its position C extends from the supply main 228' through the conductors 253, 263, segment 261, contactor 260, segment 262, conductor 264, solenoid 140, conductors 265, 266, 236, 237, to the supply main 238.

After the electro-magnet 140 comprising its solenoid and plunger has been operated to firmly apply the clutch 114 and the clutch has been locked by the toggle action of the pivot 145 as shown in Fig. 6 or by the passing of the pivot 145 to the left of the line extending through the pivots 137 and 143, the switch lever 248 may be moved to either its position C or the position E, according to what silo 29 is to be selected. For the sake of simplicity, I have shown the selector switch 246 arranged for the selection of any one of four silos, but it should be understood that there may be any number of silos on either side of the pit 21. Position D of the switch 248 represents the first silo to the left of the pit as shown in Fig. 1.

Assuming that the lever 248 is moved to its position D to select the first silo to the left of the pit a circuit will be established through the solenoid 267 designated "To left". The circuit will be from the supply main 228', through conductor 268, solenoid 267, conductor 269, segment 270, contactor 250, stationary contact 271, conductor 272, limit switch 273, wiper contactor 274, conductor bar 275 and conductors 266, 236, 237 to supply main 238.

Fig. 3 shows the connection of the selector limit switch 154 to the power transmission mechanism connected between the motor 111 and the clutch 114. This power transmission mechanism includes self-locking worm gearing 113 which is connected by means of the shaft 117 to the sprocket 158' as shown in Fig. 6.

By means of reduction gearing 275 the sprocket chain 158 is connected to a screw threaded rod 276 for operating the traveling wiping contactor 274.

When the solenoid 267 is energized its plunger 277 will be lifted to close the switch 278 connected thereto, thus connecting the supply mains to the trolley motor 111 and at the same time energizing the solenoid 155' to effect release of the brake 155. The trolley motor will then operate to drive the power transmission mechanism between the motor 111 and the hoisting drum 38. At this time the hoisting motor 40 will be stationary and the brake 153 will hold the differential gear mechanism shown in Figs. 4 and 5 in such position as to effect rotation of the hoisting drum 36 in a direction opposite to the rotation of the drum 38.

The single cable connected to the bucket carriage and trolley mechanism will then be operated to trolley the bucket out to the left from its position at the top of the pit and the guide frame 25. The selector switch mechanism 154 will then operate to move the contactor 274 to the left as viewed in Fig. 17 until it runs off the stationary bar 279 whereupon the current through the solenoid 267 will be interrupted and the switch 278 will be opened, the solenoid 155' de-energized and the brake 155 applied to stop the trolley motor 111. The bucket will then be located immediately above the first silo to the left of the pit. It can readily be seen that if the switch lever 248 had been moved to its position E on the contact 280 the bucket would have moved to the second silo to the left of the pit before the contactor 274 moved off the conductor bar 281 to effect stopping of the trolley motor.

The next operation desired after trolleying out the bucket to a selected silo, is to lower the bucket into the silo. This is done by moving the switch lever 224 in the direction of the arrow marked "Down" in Fig. 17 to cause the bar 225 to connect the segments 282 and 283, but before this can be done, the switch lever 248 must be moved back to central position by reason of the mechanical interlocks between the three switch levers.

When the switch lever 248 is moved from its position D to its position B, the circuit through the solenoid 140 is broken and therefore the clutch 114 is placed in readiness to be released but it still remains locked because of the pivot 145 of Fig. 6 still being to the left of the line between the pivots 137 and 143. However, when the switch lever 248 reaches the central position the switch 251 and 252 will be closed and the circuit through the solenoid 141 between supply mains 228' and 238 will be established. As soon as the electro-magnet 141 is energized, the clutch 114 will be forcibly released by movement of the levers to their positions shown in Fig. 6. Therefore, before the hoisting motor is operated, the trolley motor is disconnected from the hoisting drum 38 by fully releasing the clutch 114.

Now upon moving of the switch lever 224 to the left a circuit will be established from the supply main 228 through the conductor 229, the "Down" solenoid 284, conductor 285, slack cable switch 286, conductor 287, segment 282, contactor 225, segment 283, conductor 288, stationary conductor bar 234, wiper contactor 235 while in its dotted line position 235', and conductors 236, 237 to the supply main 238.

The energization of the "Down" solenoid 284 will effect lifting of the plunger 301 to close the switch 302 to effect rotation of the hoisting motor 40 in the proper direction to pay out the cable 26 from both drums simultaneously. When the switch 302 is closed the solenoid 244 is energized to effect release of the brake 153.

As soon as the filled bucket meets the top of the material previously loaded into the silo, the shoe 86 will effect unlocking of the door mechanism at the bottom of the bucket as shown in Fig. 8 and as hereinbefore explained. When this occurs the slack in the cable 26 will effect the opening of the slack cable switch 286. By referring to Fig. 1, it will be seen that when the cable 26 becomes slack by the bucket engaging the material in the silo the cable 169 becomes slack thus relieving the tension on the rope 176 and thereby permitting the weight 184 to move down and lift the lever 189 off the contacts of the slack cable switch 286.

When the slack cable switch 286 is opened, the circuit through the "Down" solenoid 284 is interrupted, the switch 302 is opened to cut off the current from the motor 40, the solenoid 244 is de-energized and the brake 153 applied to stop the hoisting motor and therefore stop the lowering of the bucket in the silo.

Now upon reversing the switch 219 by movement of the lever 224 in the direction of the arrow "Up", the contactor 225 connects the segments 226 and 227 to energize the up solenoid 230, whereupon the hoisting motor will be reversed, its brake released and the bucket lifted off the pile of coal in the silo and while this is being done the coal in the bucket will be delivered to the silo. After the bucket is emptied the doors in the bottom thereof will be closed with retarded movements during continued lifting of the bucket.

As the bucket moves toward its upper limit of travel in the selected silo, the contactor 235 will travel along the stationary conductor bar 233 until it runs off the same to its dotted line position 235', whereupon the circuit through the "Up" solenoid 230 will be interrupted and the motor stopped. Then the bucket will again be connected to the trolley carriage 87 as shown in Fig. 8.

The next operation in the cycle is to trolley back the bucket to its position at the top of the guide-way 25 above the pit 21. With the switches 219 and 246 in their central positions the "Trolley back" switch 247 should be moved to its left-hand position to effect operation of the electro-magnetic switch designated "To right". The first movement of the switch lever 289 to the left will effect opening of the switch 256 and consequently the de-energization of the solenoid 141 so as to release the clutch for application. This will be followed by the contactor 290 connecting the fixed segments 291 and 292 whereupon a circuit will be established through the solenoid 140 to cause the clutch 114 to be applied and locked in applied position to connect the trolley motor 111 to the hoisting drum 38 while the motor 40 is stationary and the brake 153 applied.

Further movement of the switch lever 289 to the left, causes the contactor 293 to connect the contacts 294 and 295. A circuit will then be established from the supply main 228' through the conductor 268, solenoid 296, conductor 297, contacts 294, 295, conductor 298, conductor bar 299 and wiper 274 while in its dotted line position 274', the circuit being completed through the bar 275 and conductors 266, 236 and 237 to the supply main 238. When the limit switch mechanism 154 causes the wiper contactor 274 to reach its full line position, it will run off the bar 299 and thereupon the circuit through the solenoid 296 will be interrupted. The switch 300 will be opened and the brake 155 applied. So long as the switch lever 289 remains in its left-hand position connecting the segments 291 and 292, the clutch 114 remains applied, but inasmuch as the switch 247 must be restored to its central or neutral position before the bucket can be lowered, the solenoid 140 will be deenergized when the contactor 290 moves off the segments 291 and 292. When the switch 256 is closed the solenoid 141 will be energized and the clutch 114 will be released.

Then upon moving the switch lever 224 in the direction of the "Down" arrow, the segments 282, 283 will be connected while the wiper contactor 235 is in its dotted line position 235'. This operation will effect the operation of the "Down" electro-magnetic switch to effect lowering of the bucket along the guideway 25. When the bucket reaches its lowermost limit of travel the contactor 235 will run off the bar 234 to its full line position and thereupon the hoist motor will be stopped and the brake 153 will be applied.

It should be understood that the hoist limit switch 152 and the trolley selector limit switch 154 may be provided with adjustable contacts to compensate for stretching of the cable 26 or otherwise, and to provide for such variations as may be desired from time to time in the operation of the system. The clutch 114 may be made of sufficient size and capacity, and so also the electro-magnets 139 and 140, to prevent slipping of the clutch when the motor 111 operates the traversing mechanism. It is desirable to reduce the slippage of the clutch to a minimum as it is used not only in the starting of the drum 38 but also in the stopping of the same, and the selector limit switch 154 is connected to operate in synchronism with the motor 111 and the drum 38. The sprocket chain 156 must be connected to the member 115 of the clutch 114 and not to the shaft 37, because the latter rotates during hoisting operations as well as traversing operations and the selector limit switch 154 is to be operated only during traversing operations.

The normal and intended operation of the system may be efficiently carried out at the control board by a single operator, particularly when such control board is located adjacent the hoist and traversing mechanism shown in Fig. 3. Such operator will know after he moves the switch 219 to "Up" position and the hoisting engine 27 stops automatically, that the bucket is at the upper limit of travel of the guide-way 25. The operator then moves the switch 219 to neutral position and operates the switch 246 as a selector switch according to the particular silo to which the material is to be delivered. The operator knows when the bucket automatically stops at the top of the selected silo, and then moves the selector switch 246 back to neutral position. He then moves the switch 219 to lower the bucket into the silo until the hoisting engine automatically stops. Then by reversing the switch 219 the bucket will be lifted, the slack cable switch 286 will be restored to its initial position, and when the hoisting engine is automatically stopped the switch 219 is moved to neutral position. Then by operating the "Trolley back" switch the bucket is moved to its position at the top of the guide-way 25. The stopping of the traversing motor is a signal to the operator to move the switch 247 back to neutral position and to move the switch 219 to "Down" position. When the hoisting engine is stopped automatically by the limit switch 152 the switch 219 is moved back to neutral position.

It must be seen that by reason of previous adjustments made of the limit switch mechanism the operator at the control board need rely only upon the operation and the stopping of the hoisting and traversing mechanism near the control board as signals to him for the operation in proper sequence of the switches 219, 246 and 247.

Obviously, those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In material handling mechanism, the combination with a bucket, of hoisting and draft mechanism connected thereto comprising a trolley, a bracket on top of the bucket, and a detent suspended from the trolley in position to enter a slot in the upper side of the said bracket when the bucket is in its uppermost position, thereby counteracting the tendency of the bucket to sway laterally when the trolley is stopped.

2. In material handling mechanism, the combination with hoisting and traversing mechanism, of a bucket, a carriage for the bucket, a track along which the carriage is adapted to travel, hoisting and traversing draft means connecting the bucket to the hoisting and traversing mechanism, the said carriage including a main frame engaging the bucket, and an auxiliary frame, a bracket mounted on the bucket, means for operating the hoisting and traversing mechanism to hoist the bucket, traverse the same to a preselected location, and lowering the bucket from such location, instrumentalities for locking the carriage in the pre-selected location when the bucket is lowered therefrom, and actuating means for the said instrumentalities operable responsive to engagement and disengagement of the bucket and carriage, the said actuating means including devices coacting with the said main and auxiliary frames and bracket to prevent the bucket from swinging relatively to the carriage upon stopping the carriage and bucket after being given a traversing movement along the track.

3. In material handling mechanism, the combination with hoisting and traversing mechanism, of a bucket, a carriage for the bucket, a track along which the carriage is adapted to travel, hoisting and traversing draft means connecting the bucket to the hoisting and traversing mechanism, means for operating the hoisting and traversing mechanism to hoist the bucket, traverse the same to a pre-selected location and lower the bucket from such location, brake devices for engaging the said track when the bucket is lowered, and actuating means for applying and releasing the brake devices incident to engagement and disengagement of the bucket and carriage, the said means comprising a plurality of cooperating plunger rods operatively interconnected with the brake devices, springs on said rods normally urging the brake devices into braking position, abutment members on the rods, and means on the bucket for engaging the abutment members as the bucket is lifted to its position on the carriage, thereby lifting the rods against the springs and raising the brake devices out of engagement with the track, the said springs cushioning the engagement of the bucket with the carriage.

4. In material handling mechanism, the combination with hoisting and traversing mechanism, of a bucket, a carriage for the bucket, a track along which the carriage is adapted to travel, hoisting and traversing draft means connecting the bucket to the hoisting and traversing mechanism, the said carriage including a main frame for engaging the bucket and an auxiliary frame, a bracket mounted on the bucket, means for operating the hoisting and traversing mechanism to hoist the bucket, traverse the same to a pre-selected location and lowering the bucket from such location, instrumentalities for locking the carriage in the pre-selected location when the bucket is lowered therefrom, and actuating means for the said instrumentalities operable responsively to engagement and disengagement of the bucket and carriage, the said actuating means including a detent carried by the auxiliary frame and engaging the said bracket for cooperating with the bracket and the said main and auxiliary frames to prevent the bucket from swinging relatively to the carriage after being given a traversing movement along the track.

5. In material handling mechanism, the combination with hoisting and traversing mechanism, of a bucket, a carriage for the bucket including a frame from which the bucket is suspended, hoisting and traversing draft means including a cable connecting the bucket to the hoisting and traversing mechanism, means for operating the hoisting and traversing mechanism to hoist the bucket, traverse the same to a preselected location, and lowering the bucket from such location, and instrumentalities for equalizing tension on the draft means during manipulation of the bucket, the said instrumentalities including a pair of sheaves mounted on the carriage frame, a third sheave intermediate the other pair and interconnected to the bucket, and eyes mounted on the carriage frame adjacent the said pair of sheaves for securing the said cable, the bucket being supported by a double loop of the cable when lowered beneath the carriage frame.

6. In material handling mechanism, the combination with hoisting mechanism, of a bucket, a single cable connecting the hoisting mechanism and bucket, means supporting the said cable for traversing the said bucket as well as hoisting and lowering the same, and cushioning means connected to a loop of the said cable to relieve the shock of stopping the bucket after traversing laterally, the said means including a rod, supporting means for the rod including a lug through which the rod moves, a collar on the rod, means including a gravity actuated weight connected with the rod adapted to pull the rod relatively to the support responsively to slacking of the cable, and a spring intermediate the collar and lug and compressible upon movement of the rod under action of the weight.

7. In material handling mechanism, the combination with hoisting mechanism, of a single cable, a bucket connected to the said cable, means supporting the said cable for hoisting and traversing the said bucket, cushioning mechanism connected to a loop of the cable to relieve the hoisting strain on the said cable and to relieve the shock of stopping the bucket after traversing laterally, the said mechanism including a rod, supporting means for the rod including spaced lugs through which the rod moves, a collar on the rod, a weight connected with the rod adapted to exert a pull on the rod to move the rod relatively to the support responsively to slacking of the cable, and springs on the rod intermediate each lug and the collar, the springs being compressible under opposite movements of the rod as the cable operates to hoist and traverse the bucket.

8. In material handling mechanism, the combination with a bucket, of hoisting and draft mechanism connected thereto comprising a trolley, a suspension bail attached to the top of said bucket, a bracket positioned above the bucket and attached to said bail, hoist cable means attached to the bracket for suspending the bucket from the trolley, and buffer mechanism on the trolley comprising a detent adapted to enter a slot in said bracket when the bucket is in its uppermost position, thereby counteracting the tendency of the bucket to swing laterally when the trolley is stopped.

SAMUEL T. BEEKER.